J. W. LIVERMORE.
GROUSER ATTACHMENT FOR TRACTORS.
APPLICATION FILED JULY 25, 1921.
1,418,585.
Patented June 6, 1922.
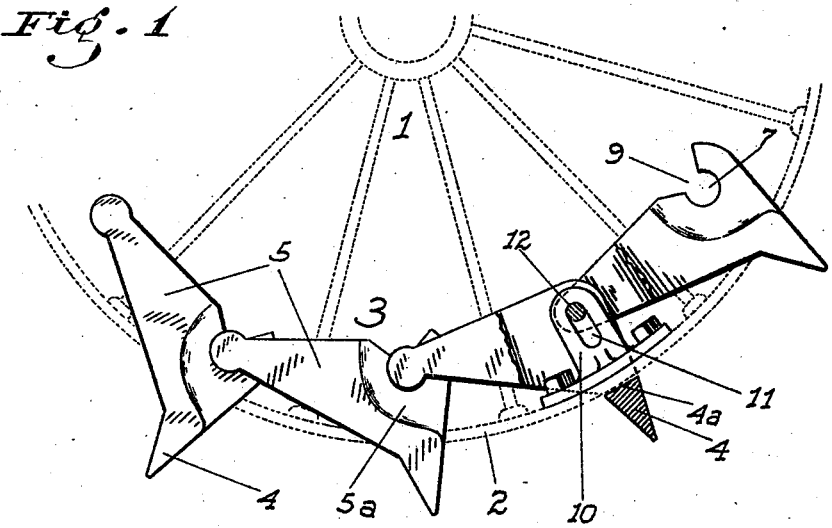
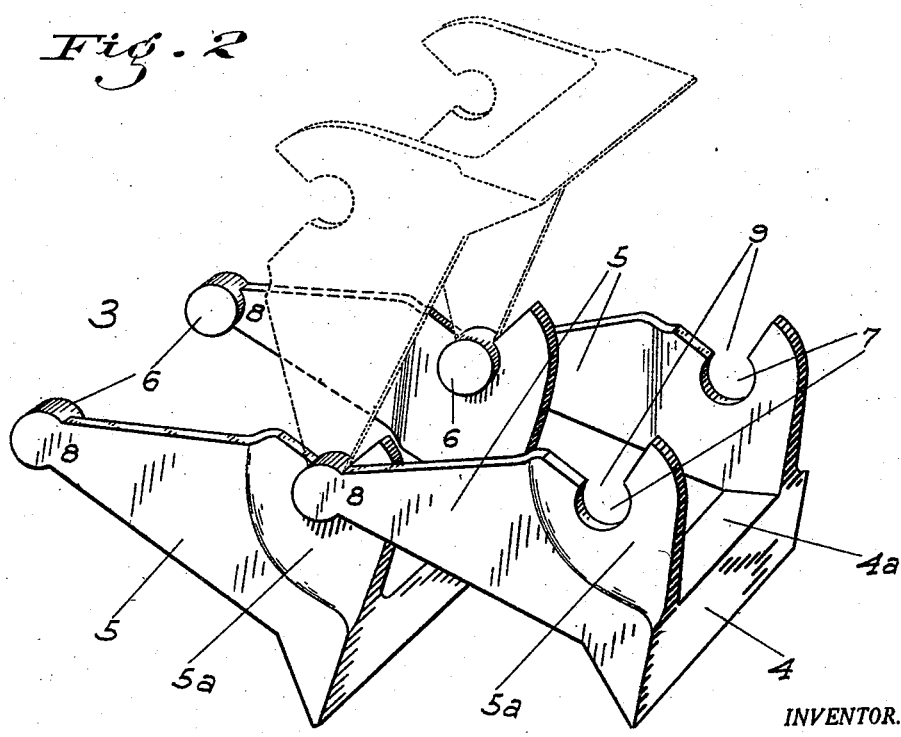
INVENTOR.
John W. Livermore
BY
ATTORNEY

UNITED STATES PATENT OFFICE.

JOHN W. LIVERMORE, OF FRESNO, CALIFORNIA, ASSIGNOR OF ONE-HALF TO A. V. LISENBY, OF FRESNO, CALIFORNIA.

GROUSER ATTACHMENT FOR TRACTORS.

1,418,585.   Specification of Letters Patent.   Patented June 6, 1922.

Application filed July 25, 1921. Serial No. 487,275.

*To all whom it may concern:*

Be it known that I, JOHN W. LIVERMORE, a citizen of the United States, residing at Fresno, county of Fresno, State of California, have invented certain new and useful Improvements in Grouser Attachments for Tractors; and I do declare the following to be a full, clear, and exact description of the same, reference being had to the accompanying drawings, and to the characters of reference marked thereon, which form a part of this application.

This invention relates to improvements in tread or traction increasing attachments for tractors and the like, the principal object being to provide a grouser attachment for tractor wheels in the form of a continuous chain, entirely independent of the wheel, but adapted to be readily attached thereto, and similarly removed, depending on the condition of the ground or road over which the tractor is moving.

Another object is to connect and arrange the grousers relative to each other so that when in position on a wheel they cannot come apart from each other, yet when removed from the wheel each individual grouser may be readily detached from the adjacent ones, without the use of bolts or any other independent fastening members.

A third object is to provide means whereby when any grouser is contacted with the ground with the rotation of the wheel, the grouser next to this one in the direction of rotation will automatically be moved to engage the ground sooner than with grousers which always maintain a definite and fixed peripheral position on the wheel. In this manner, the pull or pressure is taken by several grousers at a time, reducing the strain on any one, and decreasing the tendency of the wheel to slip.

This allows lighter grousers to be used than would otherwise have to be employed.

The fact that they are removable from the wheel, not each one separately, but all together as a unit, renders them very convenient for use when a portion of the travel of the tractor is to be over hard surfaced highways, when grousers are not only unnecessary, but are a detriment, as they tend to cut up the road surface very badly.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a partial side outline of a wheel, showing my improved grouser attachment thereon.

Fig. 2 is an enlarged detached perspective view of a connected pair of grouser links.

Referring now more particularly to the characters of reference on the drawings, the numeral 1 denotes in general a wheel having a smooth faced tread portion or rim 2.

My improved attachment comprises a plurality of independent links 3, each one comprising a ground engaging portion 4, adapted to extend transversely of the rim 2 and formed with an inner and substantially flat surface 4ª adapted to normally bear against the outer surface of the rim.

Formed integral with the tread portion 4 at the ends thereof outside the rim 2 and extending inwardly of the tread and in parallel relation to each other are flanges 5, which project rearwardly of the portion 4 relative to the direction of rotation of the wheel and following substantially the periphery thereof. At the free end of said flanges are formed transversely and alined bosses 6, facing each other, which are adapted to fit into sockets or recesses 7 formed in the adjacent ends of the flanges of the adjacent link; such ends of the flanges being formed closer together than on the other ends in order to allow the boss-carrying ends to straddle the same as shown at 5ª in Fig. 2.

In order to eliminate the need of connecting bolts and pins to hold the links connected, the flanges 5 at their points of connection with the bosses 6 are made of lesser height than the diameter of the bosses, as shown at 8, while the sockets 7 have an opening 9 about the width of the neck 8 leading into said sockets from the edge of the flanges nearest the axis of the wheel when positioned thereon, or substantially at right angles to the neck 8 when the grousers are connected in operatively alinement. Therefore to connect each grouser to its mate, they must be held substantially at right angles to each other, as shown in dotted outlines in Fig. 2, and the one moved sideways or transversely into position with each other, the necks 8 then passing freely through the narrow openings 9, until the flanges 5 are both outside the flange portions 5ª and the bosses are at rest in the sockets, when one link may be turned to line in alinement with the other, and cannot then be removed unless the above described relative positions are again assumed.

In order to positively cause the endless series of links positioned about a wheel to turn with the same, I provide lugs 10 firmly fixed on the inner face of the rim 2, there being preferably a pair of such lugs positioned on the rim in transverse alinement, which lugs have slots 11 substantially radial with the wheel, to receive a bolt or pin 12 therethrough, which pin also passes through the adjacent ends of a pair of the links, these particular links being provided with plain drilled holes instead of the bosses and sockets previously described.

To mount the attachment on a wheel, the requisite number of links are laid on the ground in continuous and connected alinement, except of course at the opposite end of the device.

The wheel is then run onto the attachment, when the free ends are connected at one of such free ends to the wheel lug by means of the bolt 12. The wheel is then rotated to wrap the links around the same, and when a complete revolution has been effected, the bolt is temporarily removed, the other free-ended link alined with the corresponding link and lug, and the bolt again inserted, thus firmly connecting the attachment to the wheel and causing it to rotate therewith.

In operation, as any one grouser contacts with the ground, the leverage-movement is set up, causing this grouser to rock about its contact 4ª with the rim as an axis, resulting in an outward movement of the opposite or boss-carrying ends of its flanges, which in turn causes a similar movement to be imparted to the adjacent end of the grouser connected thereto at that end, moving the ground bearing portion of that grouser outwardly, and causing the same to bite deeper into the ground than would otherwise be the case, thus aiding materially in the traction.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. A grouser attachment for tractor wheels comprising a plurality of independent but connected links, each link comprising a ground bearing member extending transversely of the rim of the wheel therebeyond and bearing on the outer face thereof, and flanges clear of the ground projecting rearwardly from the ground bearing member with relation to the direction of rotation of the wheel and pivotally connected to the adjacent ends of the flanges of an adjacent link.

2. A grouser attachment for tractor wheels comprising a plurality of independent but connected links, each link comprising a ground engaging member adapted to bear on the rim of the wheel on the outside thereof, flanges projecting from said ground bearing member in the general direction of the rim, said flanges being located outside said rim, and means whereby said links may be connected to each other when moved substantially at right angles but cannot be displaced when then moved to lie in continuous alinement.

3. A grouser attachment for tractor wheels comprising a plurality of independent but connected links, each link comprising a ground engaging member adapted to bear on the rim of the wheel on the outside thereof, flanges projecting from said ground bearing member in the general direction of the rim, said flanges being located outside said rim, bosses on the free ends of the flanges, and sockets provided in the opposite ends of the flanges, the flanges adjacent said bosses having necks smaller than said bosses and the sockets having outlets of a size corresponding to said necks and positioned in a plane offset from the latter when the links are positioned in operative alinement.

4. A grouser attachment for tractor wheels comprising a plurality of independent but connected links adapted to form a continuous unit with the ends free, lugs fixed on the inner face of the rim of the wheel in transverse alinement, and a pin adapted to be removably passed through the lugs and through the corresponding ends of the end links when the attachment is placed about a wheel.

5. A grouser attachment for tractor wheels comprising a plurality of independent but connected links adapted to form a continuous unit with the ends free, such ends being provided with transverse orifices lugs having slots radial with the wheel fixed on the inner face of the rim in transverse alinement, and a removably pin adapted to be passed through said slots and link-end orifices when the attachment is placed about a wheel.

In testimony whereof I affix my signature.

JOHN W. LIVERMORE.